Patented Dec. 19, 1922.

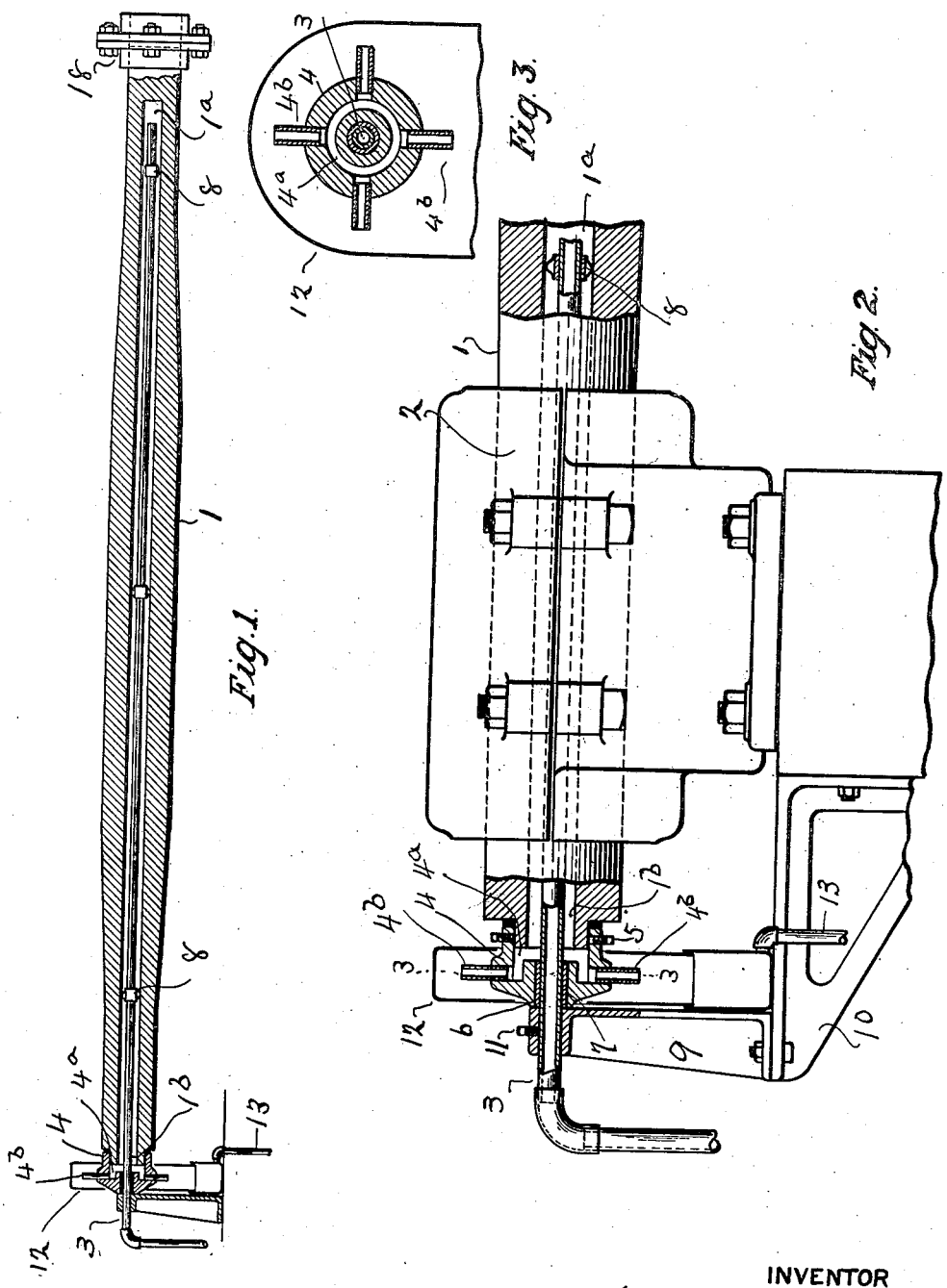

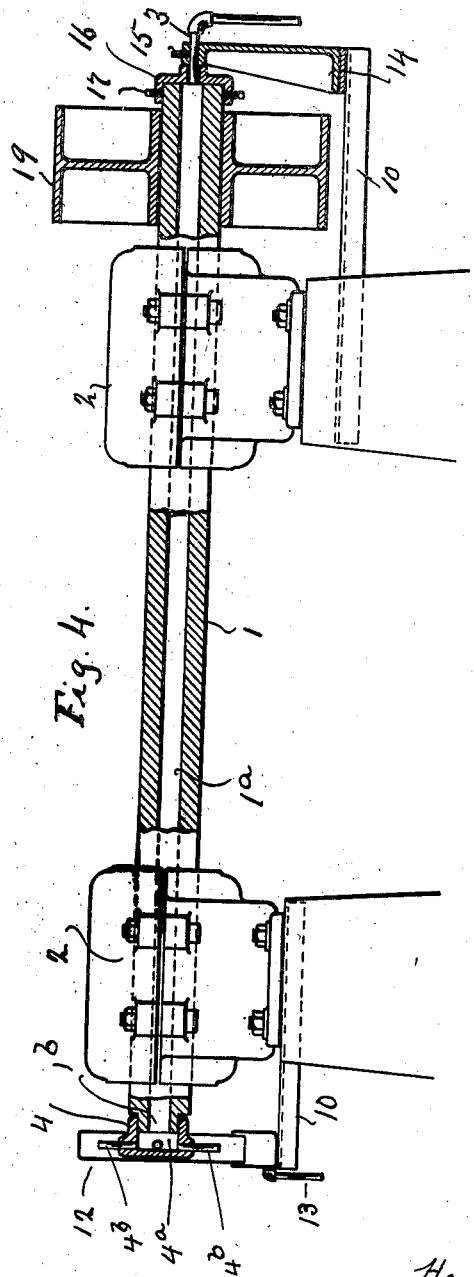

1,439,491

UNITED STATES PATENT OFFICE.

HENRY J. STEHLI, OF CEDAR GROVE, NEW JERSEY, ASSIGNOR TO SINTERING MACHINERY CORPORATION, OF MOUNT OLIVE TOWNSHIP, NEW JERSEY, A CORPORATION OF NEW JERSEY.

MEANS FOR COOLING SHAFTS.

Application filed December 10, 1921. Serial No. 521,407.

*To all whom it may concern:*

Be it known that I, HENRY J. STEHLI, a citizen of the United States, and resident of Cedar Grove, in the county of Essex and State of New Jersey, have invented certain new and useful Improvements in Means for Cooling Shafts, of which the following is a specification.

Rotative shafts used in various kinds of machinery are liable to become heated and injure their bearings. Shafts used for rotating fans or blowers that suck or blow hot air and hot gases are particularly liable to become heated and injure their bearings by reason of the transmitted heat.

The object of my invention is to provide means to keep the aforesaid shafts relatively cool so as not to overheat or injure bearings for said shafts.

In carrying out my invention I provide a hollow or tubular shaft with means to admit cooling fluid thereto, such as water, and means to maintain circulation of such fluid through the shaft during its rotation.

In the accompanying drawings I have illustrated a hollow shaft with means to admit cooling fluid to its bore, said shaft having outlets from said bore, and means to receive fluid from said outlets.

My invention also comprises novel details of improvement that will be more fully hereinafter set forth and then pointed out in the claims.

Reference is to be had to the accompanying drawings forming part hereof, wherein—

Figure 1 is a longitudinal section of a shaft embodying my invention;

Fig. 2 is an enlarged partly sectional detail;

Fig. 3 is a cross section substantially on line 3, 3, in Fig. 2, and

Fig. 4 is a sectional view of a modification.

Similar numerals of reference indicate corresponding parts in the several views.

The shaft 1 is hollow or tubular and may be supported to rotate in any suitable bearings 2. The bore $1^a$ of said shaft may extend partly through the same, as shown in Fig. 1, or may extend entirely through the shaft, as shown in Fig. 4. At 3 is an inlet pipe or conduit to admit water or other cooling fluid to bore $1^a$. In the form shown in Figs. 1, 2, and 3, the pipe extends within bore $1^a$ of the shaft from one end and terminates adjacent to the inner end of said bore, said pipe being smaller than bore $1^a$ so that fluid delivered into said bore adjacent to its closed end may flow around said pipe, through said bore, and find exit through its open end $1^b$. Shaft 1 at the exit end for the fluid is provided with a closure or cap 4, which may be secured at the end of the shaft by screws 5 or in any other suitable manner. Said closure or cap is shown provided with a chamber or cavity $4^a$ communicating with one or more outlets $4^b$ radially disposed and shown in the form of short radial tubes extending from the cap and communicating with chamber $4^a$. Cap 4, in Figs. 1, 2, 3, is shown provided with a bore or bearings 6 receiving pipe 3 to rotate thereon, by preference a bushing 7 being provided between said cap and pipe to make a fluid tight rotary fit. Pipe 3 is shown provided with bearings 8 within bore $1^a$ and supported outside of cap 4 by bracket 9 on frame 10. Pipe 3 may be secured to bracket 9 by screw 11, or in any other desired manner. The outlets $4^b$ are enclosed within a housing 12 within which the cap and outlets may rotate to collect fluid issuing from said outlets, which housing is shown supported upon frame 10. A drain pipe 13 is shown connected with housing 12 to conduct fluid from said housing.

In Fig. 4 the pipe or conduit 3 is shown supported upon a bracket 14 on frame 10 and may be retained thereon by set screw 15, which conduit opens through a cap 16 secured, as by screws 17, to the adjacent open end of shaft 1 to deliver fluid to bore $1^a$ thereof. At the opposite end of shaft 1 closure or cap 4 is applied, its outlets $4^b$ being within housing 12 in manner before explained. The cavity $4^a$ of cap 4 is shown closed in Fig. 4, at its outer wall, since pipe 3 does not pass through said cap in such construction.

Shaft 1 may be rotated in any desired manner, such as by means of a coupling 18 (Fig. 1) to be attached to a blower, fan, pump or other part, which may drive or be driven by said shaft, or said shaft may be provided with a pulley, indicated at 19 (Fig. 4), or a gear.

During rotation of shaft 1 cooling fluid, such as water, will be delivered into bore 1ª through pipe 3 and will circulate through said bore, finding its exit through one or more outlets 4ᵇ into housing 12, whence the fluid will flow through drain pipe 13, such fluid serving in its flow through the shaft to keep the same cooled to such an extent that the shaft will not injure its bearings 2. Since the outlet or outlets 4ᵇ are radially disposed respecting the axis of shaft 1 the fluid will be thrown off centrifugally at the outlets, inducing exhaust in bore 1ª of the rotating shaft, tending to suck or draw the fluid from bore 1ª with relation to the rotative speed of the shaft irrespective of the hydrostatic pressure on the fluid entering the shaft through inlet pipe or conduit 3 and thereby effecting circulation of the fluid, as desired, through bore 1ª.

My invention is particularly useful in connection with shafts liable to be heated, particularly by radiation or conduction from a part coupled to or driven by or with the shaft, such as a rotary fan or blades of a blower, used for sucking or blowing heated gases, air and the like, or means for pumping heated fluids.

Having now described my invention, what I claim is:—

1. The combination of a hollow shaft, stationary means to admit fluid thereto, said shaft having one or more radially disposed outlets rotative with the shaft and communicating with its bore to receive flow of water directly from the bore, and means to collect fluid from said outlet.

2. The combination of a hollow shaft, stationary means to admit fluid to the shaft, a closure for the bore of said shaft rotative therewith and provided with one or more radial outlets communicating with said bore, and means to collect fluid flowing from the outlet.

3. The combination of a hollow shaft, stationary means to admit fluid adjacent to one end of the bore of the shaft, a closure at the opposite end of said bore rotative with the shaft and having one or more radial outlets, communicating with said bore, and means to collect fluid issuing from the outlets.

4. The combination of a hollow shaft, stationary means to admit fluid adjacent to one end of the bore of the shaft, a closure at the opposite end of said bore rotative with the shaft and having one or more radial outlets communicating with said bore, and a housing inclosing said closure and outlet to collect fluid issuing from the outlet, and means to drain fluid from the housing.

5. The combination of a hollow shaft having one end of its bore closed and one end open, a stationary pipe extending into said bore and terminating adjacent to its inner closed end to deliver cooling fluid into said bore, a closure secured at the open end of the shaft communicating with said bore, said closure rotatively receiving said pipe and having one or more outlets communicating with said bore.

6. The combination of a hollow shaft having one end of its bore closed and one end open, a stationary pipe extending into said bore and terminating adjacent to its inner closed end to deliver cooling fluid into said bore, a closure receiving said pipe, said closure being rotative with the shaft and having one or more radial outlets communicating with said bore, and means to collect fluid issuing from said outlet.

7. The combination of a shaft having a bore closed at one end and open at the other end, a stationary pipe within the bore terminating near its closed end to deliver cooling fluid into said bore, said pipe having one or more bearings within said bore, a closure for said bore secured to the shaft and rotatively receiving said pipe and having a cavity communicating with said bore, said closure having one or more outlets communicating with said cavity.

8. The combination of a shaft having a bore closed at one end and open at the other end, a stationary pipe within the bore terminating near its closed end to deliver cooling fluid into said bore, said pipe having one or more bearings within said bore, a closure for said bore secured to the shaft and rotatively receiving said pipe and having a cavity communicating with said bore, said closure having one or more radially disposed tubes rotative with the shaft and communicating with the cavity in the closure, a housing inclosing said closure and tube to collect fluid from the closure, and means to drain fluid from the housing.

Signed at Stanhope, in the county of Sussex and State of New Jersey, this 30th day of November, A. D. 1921.

HENRY J. STEHLI.